United States Patent
Bradford et al.

(10) Patent No.: US 7,311,831 B2
(45) Date of Patent: Dec. 25, 2007

(54) FILTRATION MEMBRANE AND METHOD OF MAKING SAME

(75) Inventors: Wesley L. Bradford, Los Alamos, NM (US); Rodney E. Herrington, Albuquerque, NM (US); Allen D. Clement, Albuquerque, NM (US)

(73) Assignee: MIOX Corporation, Albuquerque, NM (US)

( * ) Notice: Subject to any disclaimer, the term of this patent is extended or adjusted under 35 U.S.C. 154(b) by 0 days.

(21) Appl. No.: 10/382,971

(22) Filed: Mar. 5, 2003

(65) Prior Publication Data

US 2004/0011723 A1    Jan. 22, 2004

Related U.S. Application Data

(63) Continuation of application No. PCT/US00/33254, filed on Dec. 8, 2000.

(60) Provisional application No. 60/230,895, filed on Sep. 5, 2000.

(51) Int. Cl.
*B01D 63/10* (2006.01)
*B01D 61/00* (2006.01)
*B05D 1/28* (2006.01)
*B05D 1/00* (2006.01)

(52) U.S. Cl. .................. 210/321.85; 210/321.76; 210/321.83; 210/321.74; 210/493.4; 210/650; 427/466; 264/132; 264/401

(58) Field of Classification Search .......... 210/321.74, 210/321.83, 456, 493.4, 498, 644, 650; 264/132, 264/401; 427/466
See application file for complete search history.

(56) References Cited

U.S. PATENT DOCUMENTS

| | | | |
|---|---|---|---|
| 3,962,096 A | 6/1976 | Ishii et al. | 210/433 |
| 4,059,530 A | 11/1977 | Luppi | 210/321 |
| 4,231,865 A * | 11/1980 | Spiegler | 210/636 |
| 4,288,326 A * | 9/1981 | Keefer | 210/637 |
| 4,426,204 A | 1/1984 | Hese et al. | 8/492 |
| 4,476,022 A | 10/1984 | Doll | 210/21.5 |
| 4,756,835 A | 7/1988 | Wilson | 210/651 |
| 4,814,079 A | 3/1989 | Schneider | |
| 4,834,881 A | 5/1989 | Sawada et al. | 210/321.74 |
| 4,855,058 A | 8/1989 | Holland et al. | 210/652 |
| 4,861,487 A | 8/1989 | Fulk, Jr. | 210/644 |
| 4,902,417 A | 2/1990 | Lien | 210/321.74 |
| 4,944,877 A | 7/1990 | Maples | 210/321.74 |
| 5,064,598 A | 11/1991 | Seiler | |
| 5,069,789 A | 12/1991 | Mohn et al. | 210/321.84 |
| 5,094,749 A | 3/1992 | Seita et al. | 210/321.75 |
| 5,102,547 A | 4/1992 | Waite et al. | 210/501 |
| 5,108,604 A | 4/1992 | Robbins | 210/321.74 |
| 5,114,582 A | 5/1992 | Sandstrom et al. | 210/321.74 |
| 5,130,159 A * | 7/1992 | Shlenker et al. | 427/2.3 |
| 5,147,541 A | 9/1992 | McDermott, Jr. et al. | 210/321.74 |

(Continued)

FOREIGN PATENT DOCUMENTS

EP    0591117 A    4/1994

(Continued)

*Primary Examiner*—Krishnan S. Menon
(74) *Attorney, Agent, or Firm*—Deborah A. Peacock; Philip D. Askenazy; Peacock Myers, P.C.

(57) ABSTRACT

A filtration membrane and method of making the same wherein the filtration membrane comprises obstructions and/or spacers.

30 Claims, 12 Drawing Sheets

U.S. PATENT DOCUMENTS

| | | | |
|---|---|---|---|
| 5,192,437 A | 3/1993 | Chang et al. | 210/321.83 |
| 5,458,774 A | 10/1995 | Mannapperuma | 210/321.83 |
| 5,460,720 A | 10/1995 | Schneider | 210/321.86 |
| 5,490,938 A | 2/1996 | Sawan et al. | |
| 5,681,467 A * | 10/1997 | Solie et al. | 210/486 |
| 5,811,251 A | 9/1998 | Hirose et al. | 435/8 |
| 5,814,172 A * | 9/1998 | Cox et al. | 156/71 |
| 6,068,771 A | 5/2000 | McDermott et al. | 210/321.83 |
| 6,165,920 A * | 12/2000 | Rubin et al. | 442/226 |
| 6,180,056 B1 | 1/2001 | McNeel et al. | |
| 6,277,282 B1 | 8/2001 | Kihara et al. | 210/652 |
| 6,413,424 B1 | 7/2002 | Shelby | 210/321.74 |
| 6,495,613 B1 * | 12/2002 | Gangnus | 523/106 |
| 6,632,357 B1 | 10/2003 | Barger et al. | 210/321.83 |
| 6,720,104 B2 * | 4/2004 | Zuber et al. | 429/38 |

FOREIGN PATENT DOCUMENTS

| | | |
|---|---|---|
| EP | 1040859 A | 10/2000 |
| WO | WO 99/26711 | 6/1999 |

\* cited by examiner

FILTRATION MEMBRANE AND METHOD OF MAKING SAME

CROSS-REFERENCE TO RELATED APPLICATIONS

This application claims the benefit of the filing of U.S. Provisional Patent Application Ser. No. 60/230,895, entitled "Reverse Osmosis Membrane and Process for Making Same," filed on Sep. 5, 2000, and PCT/US00/33254, entitled "Reverse Osmosis Membrane and Process for Making Same," filed Dec. 8, 2000, and the specification thereof is incorporated herein by reference.

BACKGROUND OF THE INVENTION

1. Field of the Invention (Technical Field)
The present invention relates to membrane filtration.
2. Background Art
Note that the following discussion refers to a number of publications by author(s) and year of publication, and that due to recent publication dates certain publications are not to be considered as prior art vis-a-vis the present invention. Discussion of such publications herein is given for more complete background and is not to be construed as an admission that such publications are prior art for patentability determination purposes.

SUMMARY OF THE INVENTION (DISCLOSURE OF THE INVENTION)

The present invention comprises a filtration membrane and method of making the same. In one embodiment, the invention also comprises a feed spacer optionally comprising flow obstructions. In this embodiment, the feed spacer optionally comprises a thickness of less than approximately 0.028 cm. In one embodiment, the present invention comprises a filtration membrane comprising printed flow obstructions wherein the printed flow obstructions optionally comprise at least one member selected from the group consisting of ink-jet, off-set, and stereolithographic printed flow obstructions and wherein the printed flow obstructions optionally comprise a thermopolymer and wherein the printed flow obstructions optionally comprise at least some feed spacers and wherein the filtration membrane optionally comprises a spiral wound membrane and wherein the membrane optionally comprises a reverse osmosis membrane. In this embodiment, the optional thermopolymer optionally comprises at least one member selected from the group consisting of hydrocarbons, urethanes, amides and esters. In this embodiment, the flow obstructions optionally comprise a maximum height of approximately less than 0.028 cm, and preferably a maximum height of less than approximately 0.015 cm.

In another embodiment, the invention comprises a filtration membrane comprising a printed thermopolymer material wherein the printed thermopolymer material optionally comprises at least one member selected from the group consisting of ink-jet, off-set, and stereolithographic printed material and wherein the printed thermopolymer material optionally comprises flow obstructions and wherein the printed thermopolymer material optionally comprises feed spacers and wherein the filtration membrane optionally comprises a spiral wound membrane and wherein the filtration membrane optionally comprises a reverse osmosis membrane. In this embodiment, the thermopolymer comprises at least one member selected from the group consisting of hydrocarbons, urethanes, amides and esters. In this embodiment, the flow obstructions optionally comprise a maximum height of approximately less than 0.028 cm, and preferably a maximum height of less than approximately 0.015 cm.

In yet another embodiment, the present invention comprises a filtration membrane comprising dimple flow obstructions wherein the dimple flow obstructions optionally comprise at least some feed spacers and wherein the filtration membrane optionally comprises a spiral wound membrane and wherein the membrane optionally comprises a reverse osmosis membrane and wherein the dimple flow obstructions optionally comprise a maximum height of approximately less than 0.028 cm, and preferably a maximum height of less than approximately 0.015 cm The present invention also comprises novel methods. According to one embodiment, the present invention comprises a method of making flow obstructions on a membrane, the method comprising the steps of: providing a membrane, wherein the membrane optionally comprises a reverse osmosis membrane and wherein the membrane optionally comprises a spiral wound membrane; and printing flow obstructions onto the membrane wherein printing optionally comprises at least one method selected from the group consisting of ink-jet, off-set and stereolithographic printing and wherein the flow obstructions optionally comprise a maximum height of approximately less than 0.028 cm, and preferably a maximum height of less than approximately 0.015 cm and wherein at least some of the flow obstructions comprise feed spacers.

In another embodiment, the present invention comprises a method of making flow spacers on a membrane, the method comprising the steps of: providing a membrane wherein the membrane optionally comprises a reverse osmosis membrane and wherein the membrane optionally comprises a spiral wound membrane; and printing flow spacers onto the membrane wherein printing optionally comprises at least one method selected from the group consisting of ink-jet, off-set, and stereolithographic printing and wherein the flow obstructions optionally comprise a maximum height of approximately less than 0.028 cm, and preferably a maximum height of less than approximately 0.015 cm.

In yet another embodiment, the present invention comprises a method of making flow spacers on a membrane, the method comprising the steps of: providing a membrane wherein the membrane optionally comprises a reverse osmosis membrane and wherein the membrane optionally comprises a spiral wound membrane; and dimpling flow spacers onto the membrane wherein dimpling optionally comprises application of at least one type of energy selected from the group consisting of mechanical and thermal energy and wherein the flow obstructions optionally comprise a maximum height of approximately less than 0.028 cm, and preferably a maximum height of less than approximately 0.015 cm. A primary object of the present invention is to improve membrane efficiency.

A primary advantage of the present invention is improved membrane efficiency.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings.

DESCRIPTION OF THE PREFERRED EMBODIMENTS

Figure 1:
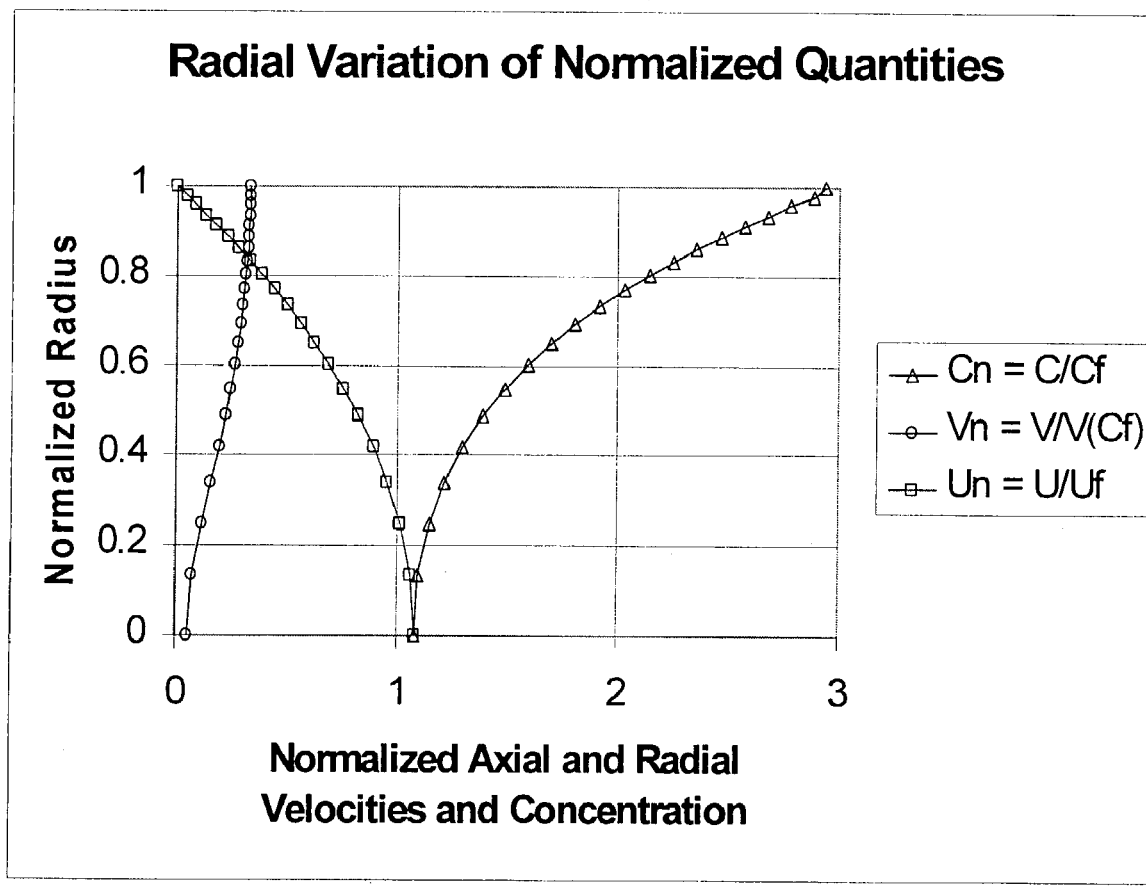
FIG. 1 is a plot of normalized radius versus normalized axial and radial velocities and concentrations.

Best Modes for Carrying Out the Invention

The present invention relates to removing the dissolved solids from water by the process known as Reverse Osmosis (hereafter, RO) to render the water thus treated potable and safe for human consumption from the standpoint of the dissolved solids (hereafter the Total Dissolved Solids or TDS) concentration. More particularly the present invention relates to alternative means to increase the production of potable water per unit size of RO unit. These alternative means include reducing the phenomenon in the RO process known as concentration polarization, thereby increasing the rate of production of potable water per unit volume or mass of RO unit employed and reducing the TDS concentration in the potable water produced by the RO process. The present invention also comprises embodiments suitable for use in fields other than RO filtration, including, but not limited to, non-RO filtration, reaction/reactor engineering, separations, and other processes.

The Function of Reverse Osmosis

Osmosis is the process whereby water moves across a semi-permeable membrane separating aqueous solutions of dissimilar TDS concentrations to achieve a balance in the chemical potential of the water on either side of the semi-permeable membrane. Because the chemical potential of the water includes the pressure head, the osmosis phenomenon is demonstrated, and quantification of the osmotic potential or osmotic pressure of a solution is made, simply by allowing the heights of two columns of two aqueous solutions containing dissimilar TDS concentrations and connected through a semi-permeable membrane, to come to equilibrium and measuring the difference in heights of the solution columns at equilibrium. In reaching this osmotic equilibrium, water moves from the column containing the aqueous solution with the lower TDS concentration to that containing the higher until the chemical potentials of the water in each column are equal.

In Reverse Osmosis (RO), pressure is applied to the aqueous solution containing the higher TDS concentration, thus increasing the chemical potential of the water in that solution, and causing water to move in the reverse direction across the semi-permeable membrane. This process produces water of a lower TDS concentration. The RO process is used commercially to remove water of a lower TDS concentration from an aqueous solution containing a higher TDS concentration. Stated in lay terms, but incorrectly in terms of actual process, RO is used to remove TDS from water, or to "desalinate" the water. Commercial RO units range in size from small enough to fit under the sink of a household kitchen and supply water containing lower TDS to the household, to large enough to supply water of lower TDS to a large city. Commercial RO units have found wide application from desalinating seawater, to desalinating brackish water, to removing the chemical components causing hardness in water, a process known as "membrane softening".

RO Technology

An RO unit consists of a module containing the RO membrane, enclosed by a housing. The housing withstands the applied pressure on the feed solution (water to be desalinated), and has plumbing which directs the feed solution properly through the module, and directs the reject solution or retentate (salt-enriched water) and the permeate (desalted water or product) to exit ports on the housing in such fashion that the solutions do not mix.

Spiral-Wound Reverse Osmosis Modules

The type of module, known as a spiral-wound module, of the type of RO units discussed herein (other types exist and are known to those of ordinary skill in the art of filtration) consists of a permeate carrier, a feed spacer, and the membrane wound together around a center collection tube (e.g., polypropylene) into a cylindrical shape.

The permeate carrier is for example, but not limited to, a highly porous thin polypropylene sheet which collects permeate after it has passed through the membrane which has removed a fraction of the TDS from the feed solution, and conveys the permeate to the center tube for collection.

As known in the art, a feed spacer typically comprises a thin, polypropylene sheet with diamond mesh or web of thin fibers of varying dimensions in both thickness of the fibers and size of the mesh; the mesh size is frequently specified as the wale density (number of strands per inch of length). One function of the feed spacer is to hold the active surfaces of the membrane apart during the manufacturing process. Another function of a feed spacer is to ensure exposure of the membrane to the feed solution and to convey the reject (retentate) to exit from the housing.

A typical membrane comprises a polypropylene fiber support sheet covered by a porous polysulfone, which further comprises a cast layer (for example, but not limited to, approximately 0.1 to approximately 1 µm) of a polyamide. Of course, membranes are not limited to materials comprising polypropylene, polysulfone, and/or polyamide because other materials, e.g., metal, ceramic, etc., are known in the art of filtration. In a typical membrane, polyamide forms an active membrane surface, or membrane layer, i.e., the layer that is primarily or solely responsible for rejecting TDS from a feed solution and for allowing passage of permeate. In general, at least one other membrane layer is present for physical support of the active layer. Of course, depending on particular use, the "support" layer optionally comprises other functions. For example, but not limited to, a catalytic support layer or support layer for other useful material.

While several embodiments of the present invention apply to active surfaces, it is understood that the invention is applicable to other surfaces, whether or not these such surfaces are used for specifically for filtration.

Commercially available spiral-wound filtration modules are typically assembled by placing together, from bottom to top, a sheet of permeate carrier and a sheet of membrane folded with the active surface inward with the fold-point toward the center tube, and separated by a sheet of the feed spacer. Glue (or other adhesive) is applied in glue lines to the perimeter (except next to the center tube) of the top face of the sheet assembly and the assembly is wound onto the center tube. When completed, the cylindrical module viewed end-on presents openings for feed solution flow to the membrane active surface only through the feed spacer (now in spiral); the permeate carrier is sealed from the feed solution by the glue lines and is open for permeate flow only at the center tube, which has holes drilled in it to accept the permeate.

Typical dimensions of sheet components of a spiral-wound module are: membrane—approximately 0.008 inches (8 mils) or 0.02 cm; permeate carrier—10 mils (0.025 cm); and feed spacer—11 mils (0.028 cm), although in special applications feed spacers of as thick as 40 mils (0.1 cm) have been used. Typically, the center tube is 0.87 in. (2.21 cm) OD and wound diameters of modules are by design.

Reverse Osmosis System Hydraulics

In a traditional spiral-wound module, a feed solution enters through feed spacer openings and is driven under pressure in cross-flow to the membrane, i.e., parallel to the membrane surface. Desalted (or reduced TDS) permeate passes through the membrane perpendicular to the membrane surface into the permeate carrier. Reject (retentate) continues in cross-flow across the membrane surface to the exit from the housing. Additional permeate is removed through the membrane as it proceeds the length of the module.

In order for reverse osmosis to occur, the applied pressure ($\Delta P$) on the feed solution must, at a minimum, equal the osmotic pressure ($\pi$) of the solution at the active surface of the membrane. In order for practical fluxes (volume/unit time/unit area of membrane surface, commonly gallons per square foot per day, abbreviated gfd) of permeate to pass through the membrane, $\Delta P$ must exceed $\pi$; the flux ($J_v$) (also called membrane permeability) of permeate is approximately proportional to the operating pressure ($\Delta P - \pi$). The proportionality constant is called the specific permeability ($J_{v\ sp}$) with units of volume/unit time·area·pressure (commonly, gallons per day per square foot per pounds per square inch gauge pressure, abbreviated gfd/psig).

The osmotic pressure, $\pi$, of an aqueous solution is proportional to the TDS concentration. Thus, as the feed solution passes through the module and has permeate removed from it, the TDS of the remaining solution (the reject) increases and $\pi$ also increases. The increase in TDS by this process is, to a first approximation, $1/(1-\Delta)$ where $\Delta$ is the permeate recovery defined as the ratio of permeate flow to feed solution flow through the RO unit. Values of $\Delta$ are typically 0.1-0.3; thus values of $1/(1-\Delta)$ rarely exceed 1/0.7, or 1.43.

A more important process, in terms of RO performance, is known as concentration polarization. As permeate passes through the membrane, a net lateral flow (toward the membrane surface) of feed solution must occur to replace the permeate lost from the feed solution. As a result of this net lateral flow, dissolved salts accumulate at the membrane surface, increasing the TDS at the membrane surface above that of the bulk feed solution. When this TDS accumulation at the membrane surface, or concentration polarization occurs, two things happen and both of them are detrimental from the standpoint of RO performance: (i) the osmotic pressure of the fluid at the membrane surface increases, thereby decreasing the operating pressure; and (ii) flux of salt (or other solids) through the membrane can increase. In general, the flux of salts, or solids, across the membrane is proportional to the gradient of salt concentration across the membrane, but independent of the operating pressure. The flux of permeate, however, is substantially proportional to the operating pressure. The net result of detrimental concentration polarization is reduced permeate flux and a potentially higher TDS concentration in the permeate.

Dissolved salt (or solids) accumulation through advection is balanced by diffusion of dissolved salts (or solids) under a concentration gradient, and by fluid shear, back into the bulk feed solution. Nevertheless, the effect of concentration polarization is substantial as illustrated in FIG. 1.

FIG. 1 shows a plot of variation in normalized axial fluid velocity ($U_n$), radial fluid velocity ($V_n$) and TDS concentration ($C_n$) with distance from the center of the channel to the membrane surface ($J_{v\ sp}$=0.30 gfd/psig; $\Delta$=0.445). The results presented in FIG. 1 were obtained from a fluid dynamic model of a 20 mil (0.05 cm) wide channel containing a 10 g/L NaCl feed solution moving in cross-flow to the membrane axis, modeled in two dimensions. The TDS concentration is seen to increase from the center of the channel (Normalized Radius 0) to the membrane surface (Normalized Radius 1) by a factor of 2.9, ie. TDS 2.9 times more concentrated at the membrane surface than in the bulk feed solution.

The degree of concentration polarization varies with the recovery ($\Delta$), the specific permeability ($J_{v\ sp}$) the TDS of the feed solution, the velocity of the feed solution in the module which affects the fluid shear, and several other factors; the degree of TDS increase discussed above (2.9 times the bulk feed solution) is but one illustration of detrimental concentration polarization.

Spiral-wound RO Modules and Feed Spacers

The spiral-wound module is the most popular RO unit in the industry. It can be, and is, made in sizes ranging from small for under-the-sink home use to very large for desalination of drinking waters provided by large, municipal water treatment plants.

Technical literature, research and discussions with RO manufacturers, other technical experts, and consultants indicate that: (1) current standard feed spacers in RO modules are typically 20 mils (0.020 inches, 508 μm) thick and constitute about 40% of the cross-sectional area of the inlet end of an RO module; (2) wale densities range from about 12/inch (4.5/cm) to about 32/inch (13/cm); (3) structures in the feed spacers are primarily for mechanical support in the process of winding the RO module, not for fluid hydrodynamic considerations in reducing concentration polarization (a water-soluble feed spacer has been reported which, after winding the module and placing it into service, dissolves away; permeate flux is optionally improved using this feed spacer); (4) at present, the most popular feed spacer design used is of butcher cabinet liners, a design that has remained largely unexamined and un-optimized; (5) while feed spacer manufacturers are continuing to develop thinner (currently as thin as 11 mils (0.028 cm)) products with structures designed to accomplish various functions (such as biofouling control), apparently no systematic study has been made to improve feed spacers for reducing concentration polarization; and (6) the thinnest feed spacer available (about 11 mils (0.028 cm)) may represent a lower limit of manufacturing capability for a separately fashioned feed spacer.

Indeed, the technical literature is largely, if not totally, devoid of discussion on the design of feed spacers. For example, a recent publication on membrane treatment processes produced by the American Water Works Association Research Foundation, Lyonnaise des Eaux, and the Water Research Commission of South Africa does not mention the feed spacers at all. See Mallevialle, J., P. E. Odendaal, and M. R. Wiesner (eds), 1996, *Water Treatment Membrane Processes*, McGraw-Hill Book Co., New York, N.Y., which is incorporated herein by reference. The reasons for this lack of attention to concentration polarization and the possible designs of feed spacers to reduce it are likely economic; i.e., relatively inexpensive means for accomplishing satisfactory RO permeate production have been developed in large scale already, and a significant amount of research and engineering would be required to improve the permeate flux achievable to the point where a significant reduction in permeate production costs would occur.

Means for Enhancing Permeate Production in Reverse Osmosis

Any attempt to develop practical portable desalination units using RO, however, necessitates consideration of any means to increase permeate flux (volume/unit area/unit time). Such increases would enable the same permeate production capability to be packaged in a smaller and lighter RO unit.

Increase Membrane Area by Using a Thinner Feed Spacer

The volume rate of permeate production per total volume of module depends on the useable surface area of membrane that can be contained within the module. In general, membrane thickness and of permeate carrier thickness are fixed at practical limits through existing manufacturing and permeate flow (in the permeate carrier) considerations. According to the present invention, a significant increase in membrane surface area within a given module volume (and, therefore, in the volume rate of permeate production from a given module volume) is obtained by decreasing the thickness of the feed spacer. Of course, flow characteristics of reduced feed spacer embodiments are suitably maintained so as to provide adequate flow characteristics.

Figure 2:
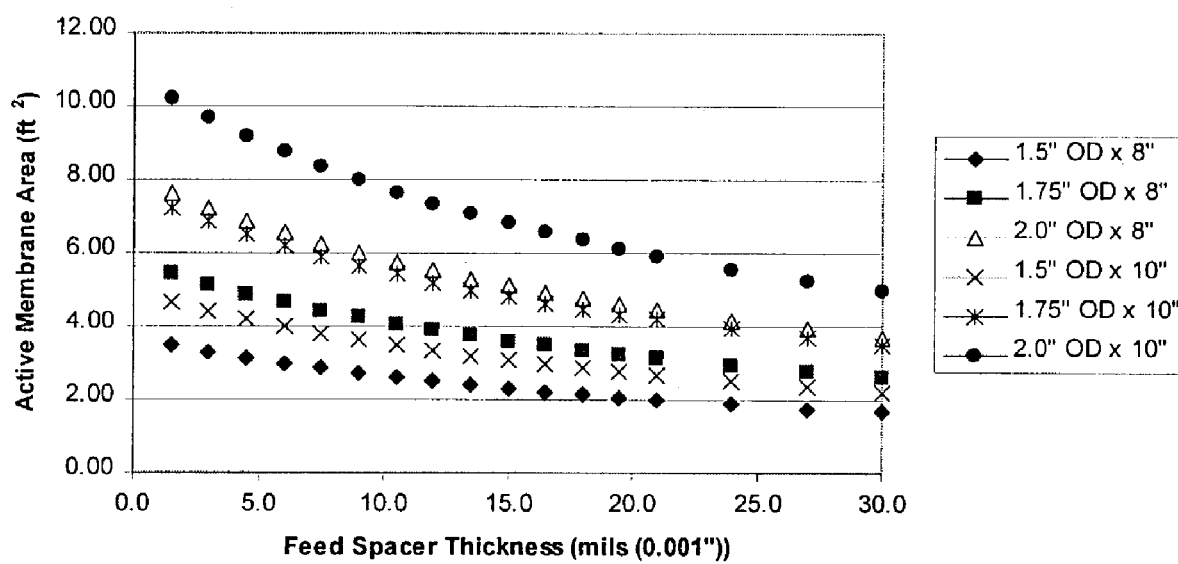
FIG. 2 is a plot of active membrane area versus feed spacer thickness.

The relationship between active membrane surface area and feed spacer thicknesses is illustrated in FIG. 2. FIG. 2 shows active membrane surface area in modules of 1.5 (3.8 cm), 1.75 (4.4 cm), and 2.0 inches (5.1 cm) finished outside diameter and 8 inches (20 cm) and 10 inches (25 cm) cut length as a function of feed spacer thickness. The results of FIG. 2 indicate that the active membrane area within a given module volume is increased by about 60% by using a 3-mil (76 μm) rather than a 20-mil (500 μm) feed spacer, and about 30% by using a 3 mil rather than a 11 mil (279 μm) feed spacer. Such an increase in membrane area enables comparable reductions in the overall size and mass of a portable RO unit. A practical lower limit on the thickness of the feed spacer is most likely related to pressure losses along the length of a spiral-wound module. Results from numerical studies indicate that such pressure losses become noticeable at thickness less than approximately 3 mils (0.008 cm) but would not be significant compared to applied pressures even at 1.5 mils (0.004 cm) thickness.

Reducing Concentration Polarization by Increasing Diffusion and Fluid Shear

As an additional benefit of decreasing the thickness of the feed solution channel (ie. the feed spacer), the TDS concentration gradient is forced to increase by virtue of the decreased dimension, thereby increasing the salt (or solids) flux from the membrane wall back into the bulk feed solution according to the diffusive flux equation (Fick's Law):

$$\text{Salt Flux} = -D\frac{dC}{dy}$$

where
D is the diffusion coefficient of the salt ($L^2/t$)
C is the salt concentration ($m/L^3$)
y is ½ the channel thickness (L)

and the rate of change of salt (or solids) concentration is expressed as $$\frac{\partial C}{\partial t} = -D\frac{\partial}{\partial y}\left(\frac{\partial C}{\partial y}\right)$$

The net effect of this increased diffusive flux from the membrane surface is to reduce concentration polarization, allowing an increase in the operating pressure and an increase in permeate flux ($J_v$).

In addition, as the thickness of the feed channel decreases, given a constant feed solution volume flow rate into a given standard diameter module, the velocity of the feed solution in the channel increases which, together with the smaller dimension, causes an increase in the fluid shear as discussed below. The fluid shear τ is defined as:

$$\tau = \upsilon\frac{dU}{dy}$$

where
τ is the fluid shear ($L^2/t^2$) in parabolic flow between two parallel surfaces
ν is the kinematic viscosity of the fluid ($L^2/t$)
dU/dy is the gradient in velocity from the parallel surfaces to the center of flow (1/t)

In parabolic flow between two parallel surfaces, $$\tau = \nu \frac{4U_{max}}{D}$$

and $$U_{max} = 1.5\overline{U}$$

where
  $U_{max}$ is the maximum fluid velocity in a parabolic flow distribution (L/t)
  $\overline{U}$ is the average fluid velocity in a parabolic flow distribution (L/t)
  D is the distance between the parallel surfaces (L) (the feed spacer thickness)

The Strain Rate $\phi$ (1/t) is a term also used where the kinematic viscosity is constant.

$$\phi = \frac{dU}{dy} \quad \text{therefore} \quad \phi = \frac{\tau}{\nu} = \frac{4U_{max}}{D}$$

The Strain Rate $\phi$ as a function of spacer thickness (D), incorporating also the increase in fluid velocity with decreasing spacer thickness, was calculated to increase dramatically at feed spacer thicknesses less than approximately 5 mils. At feed spacer thicknesses of approximately 3 mils and less, the pressure loss, the feed solution velocity, and the strain rate—all three of which are related—increase exponentially. The increase in salt (or solids) diffusion and in the strain rate with decreasing feed spacer thickness has the beneficial effect, illustrated below, of dramatically decreasing the degree of concentration polarization but at a cost of increasing the pressure drop through the length of the module. Clearly an optimal thickness of the feed spacer should be chosen experimentally and according to an embodiment of the present invention, an optimal thickness, from a fluid dynamics standpoint, is approximately 3 mils (approximately 0.008 cm).

Figure 3:
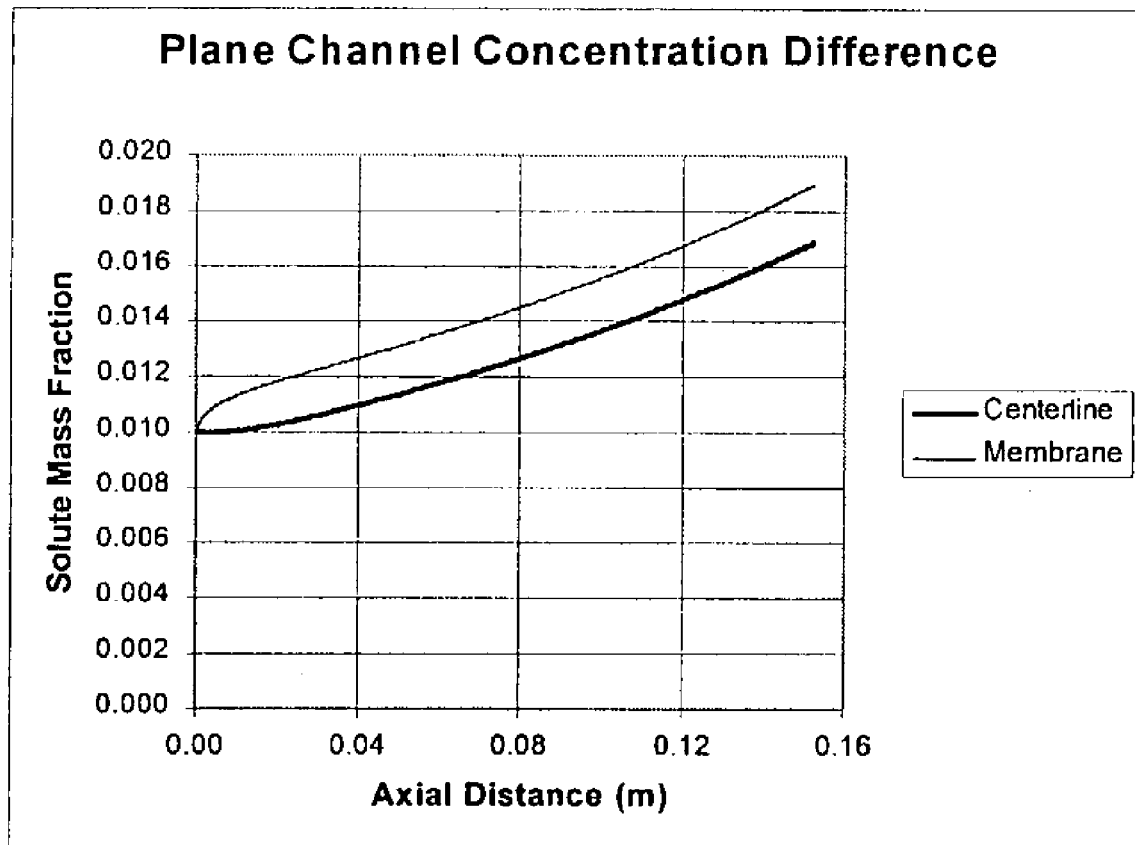
FIG. 3 is plot of solute mass fraction versus axial distance.

The effect of the aforementioned forces on concentration polarization is demonstrated by comparing the results shown in FIG. 3 for a 3-mil (0.008 cm) feed spacer with the results in FIG. 1 for a 20-mil (0.05 cm) feed spacer. FIG. 3 shows solute (TDS) concentrations at the membrane surface and at the center of the channel for a 3-mil (0.008 cm) channel (feed spacer) thickness as a function of distance down the channel (module) for a feed solution of approximately 10 g/L NaCl and ΔP of approximately 450 psi.

In the 20-mil (0.05 cm) channel, the ratio of solute (TDS) concentration at the membrane versus concentration in the bulk solution is about 2.9; in the 3-mil channel (0.008 cm), that ratio is about 1.13. Results indicate that the degree of concentration polarization is reduced dramatically in the thinner channel, to the point that it is substantially insignificant.

Reducing Concentration Polarization by Pressure/Flow Pulsing of the Feed Solution To date, the best studied and purportedly most feasible means of reducing concentration polarization consists of pulsing the pressure and volume of the feed water into the RO unit. Several examples of such techniques are disclosed in Patent Cooperation Treaty Application US00/14513, entitled "Portable disinfection and filtration system," assignee MIOX Corporation, which is incorporated herein by reference for purposes including, but not limited to, pulsing and RO applications. Pulsing techniques have been reported to attribute to net increases in permeate flux of 70% to 270%. The reduction in concentration polarization due to pulsing has been attributed to removal of concentration polarization by a regular reversal (or other disturbance) of feed solution flow provided by pulsing.

In order to demonstrate the usefulness of methods and apparatus of the present invention, in particular, an RO unit and a hand/foot-operated pump which make use of means to reduce concentration polarization, a fluid hydrodynamic model was used to show RO process behavior under pressure/flow pulsing conditions. In one embodiment, the present invention comprises an apparatus by which pressure/flow pulses are optionally superimposed on a steady applied pressure.

Figure 4:
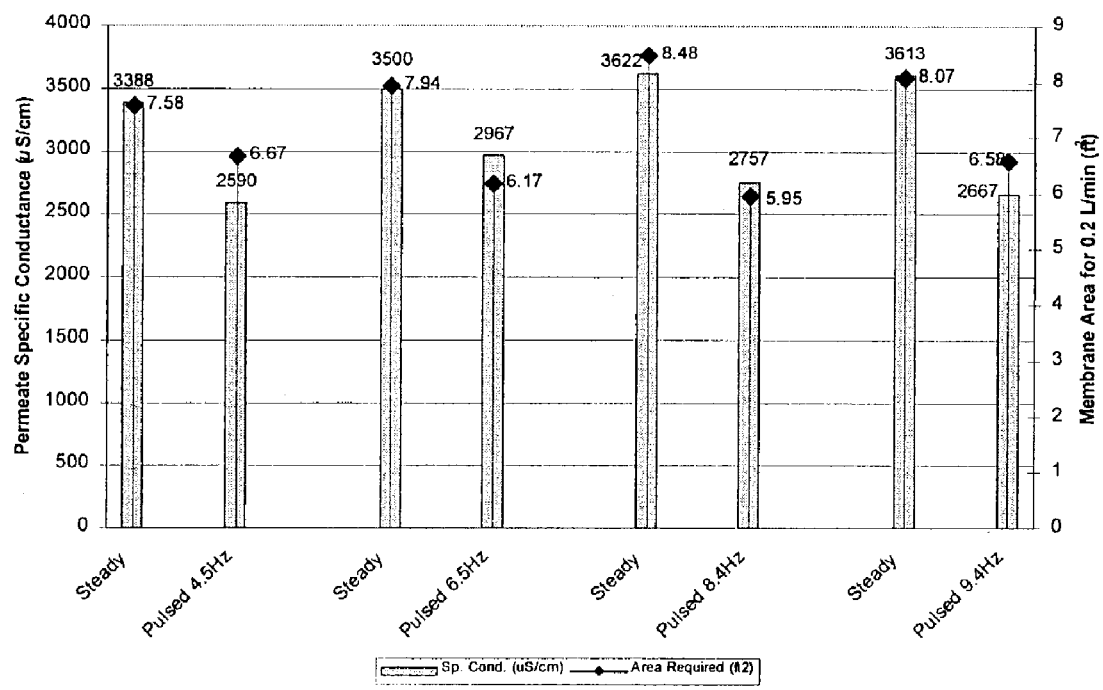
FIG. 4 is a plot of permeate specific conductance and membrane area for a variety of pulsed and steady flow conditions.

Results for pulsing of pressure/flow in operation of small RO units are shown in FIG. 4. FIG. 4 shows improvements in RO performance by pulsing at various frequencies and for a reject pressure of approximately 250 psi and a feed solution solids concentration of approximately 10 g/L feed solution at approximately 25° C. The results show that pressure/flow pulsing causes improvements in the apparent specific permeability of the membrane: in FIG. 4, represented as the membrane area needed to produce a permeate flow of 0.2 L/min (1.0 liters in 5 minutes); and in the specific conductance (a surrogate measurement for TDS).

Subsequent results from numerical models using model input parameters consistent with those of the actual conditions showed excellent agreement between reported and model results, again, confirming the usefulness of pulsing. The 70% to 270% improvement in permeate flux by pulsing reported in the technical literature are, in some ways limited to the dimensions of the testing channels and the feed solutions used, and not to be commonly expected in RO of waters containing dissolved solids. Other results indicate that the degree of improvement in permeate flux is related to, for example, wale density—that is, the openness—of the feed spacer. According to an embodiment of the present invention, to increase permeate flow, feed spacers should be more open, as well as thinner, than those of current industry practice.

Figure 5:
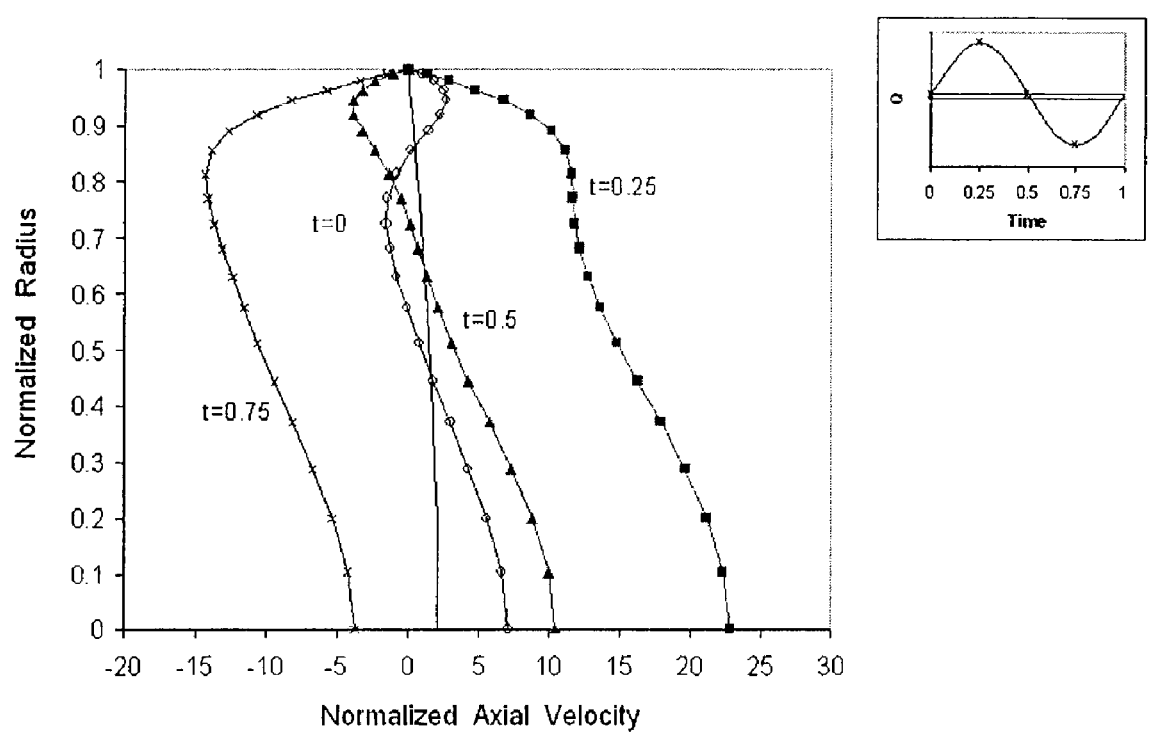
FIG. 5 is a plot of normalized radius versus normalized axial velocity for several times.

Results from computer-based numerical models of the effects of pulsing on permeate flux duplicated published results (e.g., a 70% increase with a 1 Hz pulse) and added a considerable new level of detail to the understanding of the hydrodynamic process. Specifically, according to the results, a reduction in concentration polarization in the 1.3-cm channel with 2% sucrose as the feed solution was caused by a flow reversal at the membrane surface, accompanied by a change in the lateral flow profile from parabolic (decreasing near the membrane surface) to non-parabolic. Note also that a major difference between sucrose and NaCl or other dissolved solids present in natural waters is in the diffusivity; sucrose being a large molecule has a relatively low diffusivity compared to other dissolved solids. The diffusivity is important because diffusion of salts away from the membrane surface is a major force decreasing concentration polarization. The localized vorticity caused by this change in lateral flow profile caused the concentration polarization to be largely removed with each pulse. FIG. 5 shows a typical set of velocity profiles at four points during the pulsation cycle with frequency 1 Hz in a 1.3-cm channel compared with the velocity profile under steady flow (the near-vertical line).

Results were also obtained after modifying the numerical model using channel dimensions and feed solutions similar to those used in commercial RO units. According to these modifications, the channel dimension was reduced to 20 mil (0.020 inches or 0.05 cm) from the originally-modeled 0.512 inches (1.3 cm) and the feed solution was set at approximately 10,000 mg/L NaCl. Other modifications were made to simulate targeted high permeate recoveries.

Figure 6:
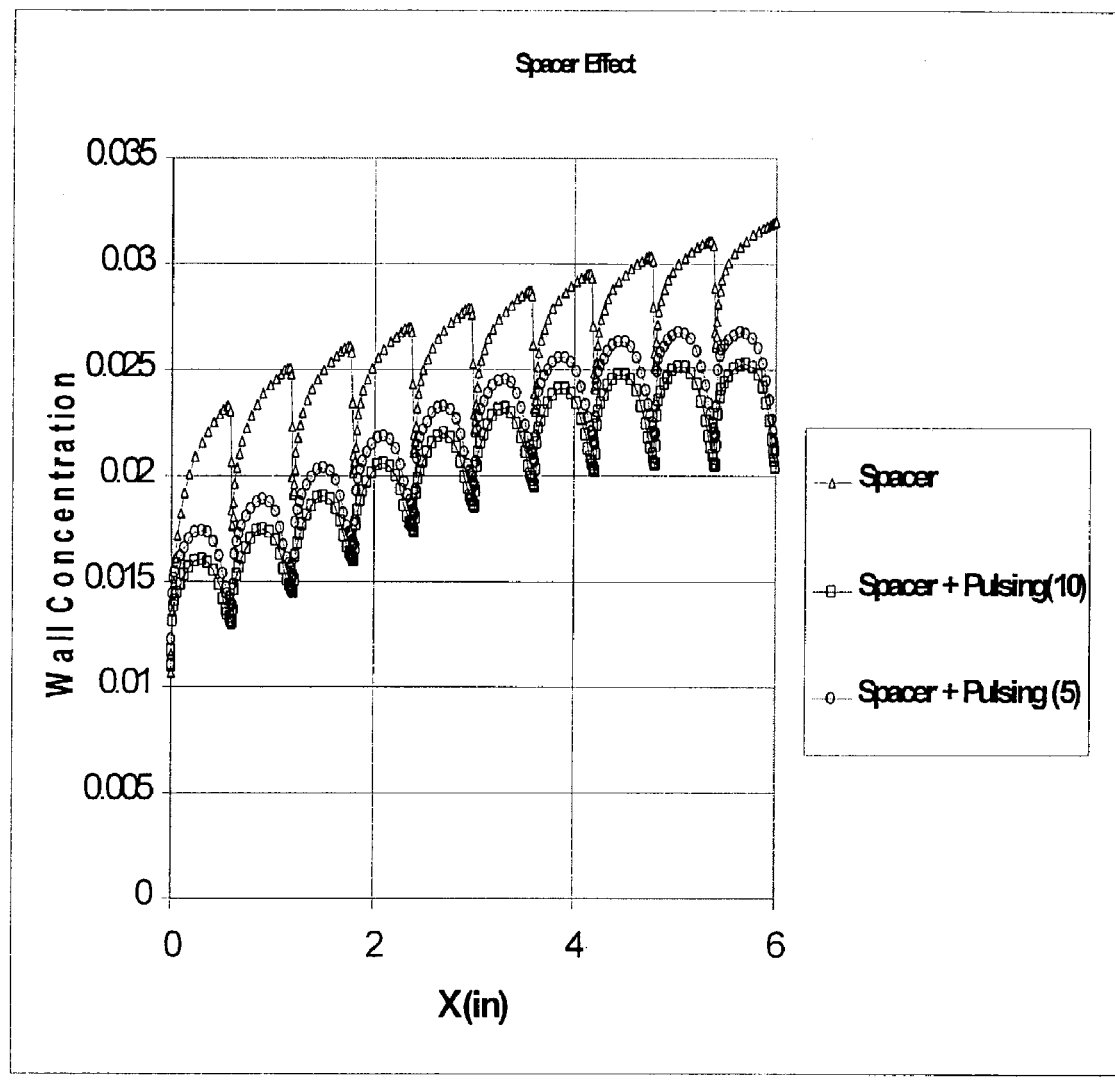
FIG. 6 is a plot of membrane wall solute concentration with pulsing at 5 Hz and 10 Hz in a baffled channel.

Results from initial model runs comparing steady flow with pulsing flow found no increase in permeate flow at the same pulsing frequency (1 Hz) used in the original modeling at a spacer thickness of 1.3 cm (0.512 inches). In subsequent modeling, however, "baffles" were introduced in the model into the channel to simulate the structure of the feed spacer in an RO module. Results from the baffle model showed significant increases in permeate flow in steady flow mode and significant increases in permeate flow by pulsing compared to the steady flow mode. The combined effects of the baffles and pulsing in a 20-mil (0.05 cm) feed spacer are illustrated in FIG. 6. FIG. 6 shows variations in membrane solute concentration with pulsing at 5 Hz and 10 Hz in a 20-mil baffled channel.

Resulting flow profiles exhibited a form of localized vorticity. Increases in permeate flow occurred with increasing numbers of baffles (or baffle density), increasing pulsing frequency, and increasing pulsing stroke volume or amplitude (expressed as a fraction of the total feed spacer volume). These results indicate that the numbers (density), shapes, and positions of baffles in the channel (which optionally equate to the structure of the feed spacer in an RO module), and the pulsing stroke volume are key parameters which are optimizable depending on, for example, specific application.

Reducing Concentration Polarization by Inducing Localized Vorticity

The localized vorticity discussed above, which results indicate was created by in part by pulsing, is expected at least analogous to, von Karman vortex streets, (first elaborated by von Karman and thoroughly discussed theoretically by Schlichting, see, e.g., Schlichting, H., 1960, *Boundary Layer Theory*, Fourth Edition, translated by J. Kestin, McGraw-Hill Book Co., New York, N.Y., which is incorporated herein by reference) developed as the fluid moves relative to an obstruction (e.g., "baffle"). The von Karman vortex streets, or vorticiy observed in pressure/flow pulsing results, are also developed in steady flow. Reynolds number ($R_e$) is defined as follows for the geometry of interest:

$$R_e = vD/v$$

where v is the fluid velocity (L/t)

D is the distance between surfaces or the diameter of the obstruction (L)

v is the kinematic viscosity of the fluid ($L^2$/t)

For a more in-depth description of the Reynolds number see, e.g., Goldstein, S., ed., *Modern Developments in Fluid Dynamics: An Account of Theory and Experiment Relating to Boundary Layers, Turbulent Motion and Wakes*, Volume II (1957), which is incorporated herein by reference. The Reynolds number at which von Karman vortex streets are known to develop in open, unbounded channels is as low as approximately 65, and in confined channels about 100, see, e.g., Ferzinger, J. H. and M. Peric, 1997, *Computational Methods for Fluid Dynamics*, Springer, New York, N.Y. (1997) [specifically see p. 364 figures on p. 250 show von Karman vortex streets forming at $R_e$ about 100 in constrained channel flow], the entire text of which is incorporated herein by reference. Given sufficient fluid velocity (v), the development of von Karman vortex streets, and their attendant localized vorticity even in steady flow, can be enhanced by using shapes for the obstructions in the feed channel (as crafted into a feed spacer) having higher drag coefficients (see, e.g., Goldstein, S., supra).

Thin Feed Spacers

An embodiment of the present invention comprises printing of a spacing material directly on a membrane. Another embodiment of the present invention comprises printing of a spacing material directly on one-half of the total membrane length required to fit into a module of specific diameter prior to winding. The printing is of thickness shown to optimize the performance of the RO unit, is thinner than the thinnest of the current industry standard feed spacers (currently approximately 11 mils, or approximately 0.03 cm, thick), and is as thin as approximately 1.5 mils, or approximately 0.004 cm. According to the present invention, this technique is applicable to any membrane technology including reverse osmosis, nano-filtration, ultra-filtration, micro-filtration, and particle filtration. One of ordinary skill in the art of membrane technology would understand that the present invention is useful for a variety of membrane applications and devices. The invention is also useful in processes wherein heating, reaction, and/or other processes are involved with or without a filtration process. Thus, for example, a spacer comprising a catalyst is useful as a catalytic bed, again, with or without filtration. In other word, the scope of the present invention comprises a new apparatus and method for contacting materials, particularly, but not limited to, a fluid and a solid, especially wherein a specific flow field is desired or desirable.

Figure 7A:
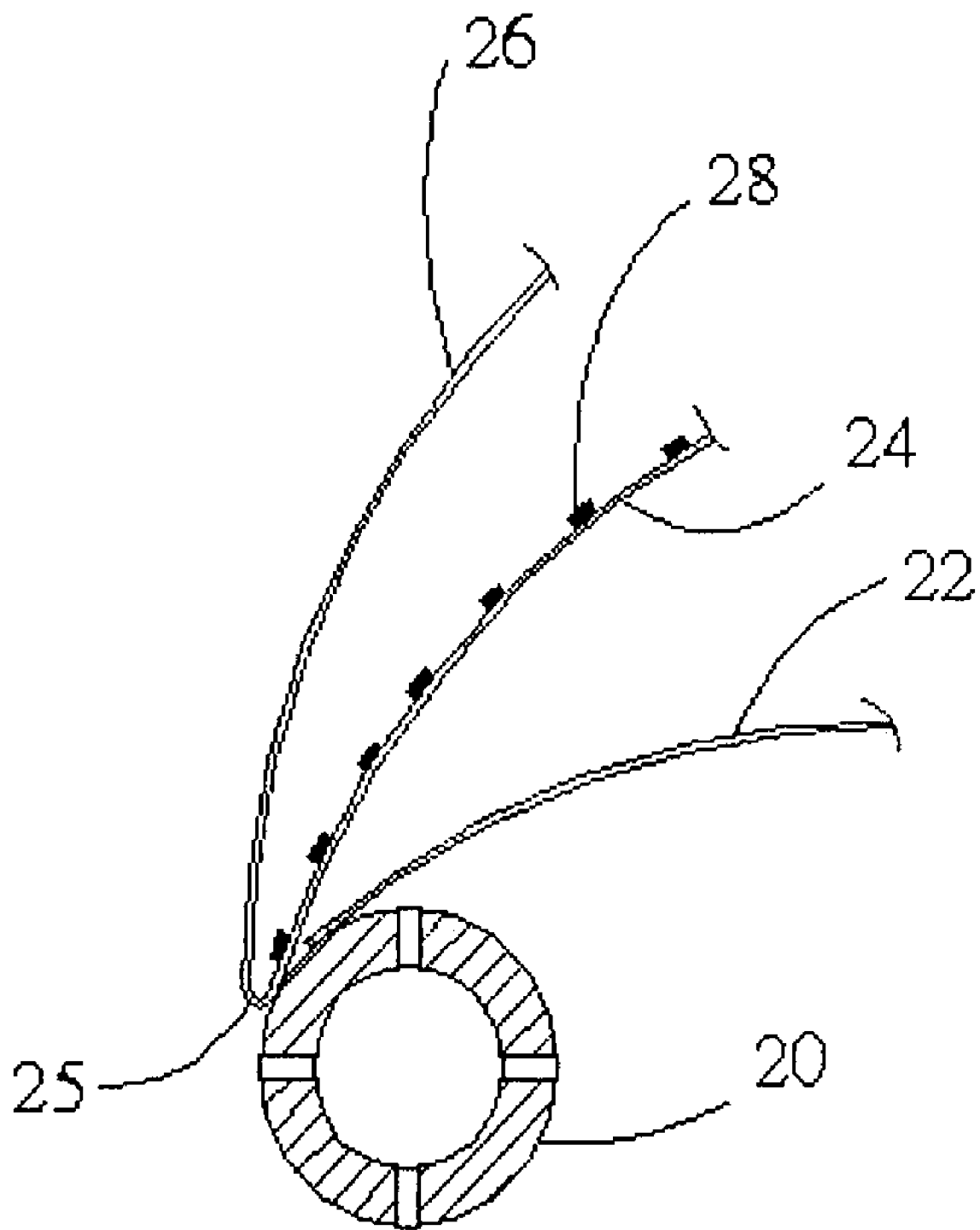
FIG. 7A is an illustration of a spiral wound membrane assembly according to an embodiment of the present invention.

A conventional process of rolling a reverse osmosis spiral wound membrane element includes a central permeate tube, a permeate feed carrier sheet, reverse osmosis membrane sheet, and feed spacer sheet layered between the membrane sheet that is folded over on itself. The sheets are wrapped around the central permeate tube and the outside of the wound element is wrapped with, for example, tape to hold the assembly together. An embodiment of a spiral wound membrane of the present invention is shown in FIG. 7A.

The central permeate tube 20 is glued (or otherwise attached) to the permeate carrier sheet 22 along the longitudinal axis of the permeate tube 20. The reverse osmosis membrane sheet 23 (or alternatively other filtration membrane) comprises an obstruction, or baffle, side 24 (i.e., a side comprising flow obstructions, or baffles) and an opposite side 26 that is folded at seam 25. As mentioned above, the obstruction side 24 comprises obstructions 28, or baffles, for affecting fluid flow. As shown in FIG. 7A, the obstruction side 24 comprises baffles on approximately one-half of its surface, which, in this case, is the half that lies adjacent to the permeate carrier sheet 22. The other half of the obstruction side (the side not comprising obstructions) covers the obstructions. Alternatively, the entire side comprises obstructions that align with and/or are interspaced with those of the other half.

In this embodiment, active membrane surfaces of the reverse osmosis sheet face each other. In addition, in this embodiment, obstructions 28 comprise feed spacers. The invention is not limited, however, to all obstructions comprising feed spacers, because a combination of feed spacers "obstructions" and non-feed spacer obstructions are possible. In general, a feed spacer obstructs some flow regardless of its particular design. However, according to the present invention, an obstruction optionally comprises a shape that obstructs, affects, or otherwise alters flow in a desirable manner. As also mentioned herein, obstructions and/or spacers are optionally printed on (or otherwise created on or placed on), for example, one-half of the membrane sheet. In an alternative embodiment, described in more detail below, obstructions comprise dimples, for example, dimples in a membrane. Depending on the characteristics of the dimples, they optionally comprise feed spacers as well. Thus, embodiments comprising a combination of dimples, feed spacers, and/or non-dimple obstructions are within the scope of the present invention.

Figure 7B:
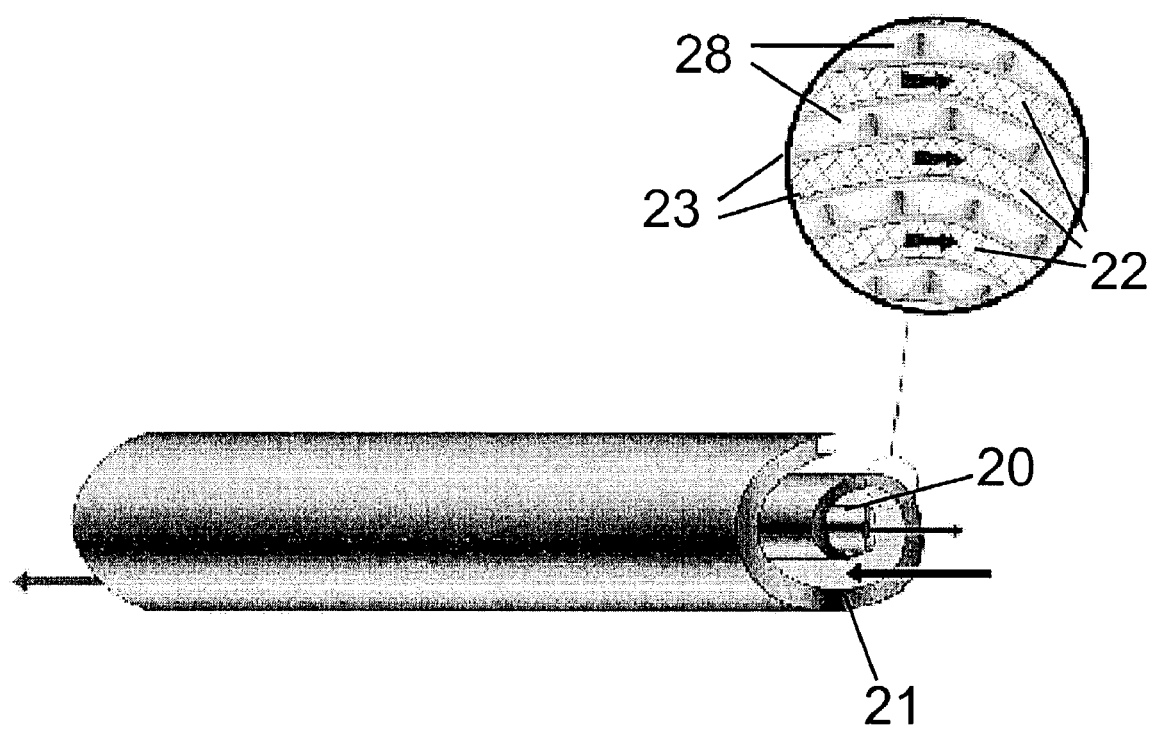
FIG. 7B is an illustration of a spiral wound membrane assembly according to an embodiment of the present invention with a close-up, cross-sectional view of a membrane assembly.

An illustration of a spiral-wound membrane is shown in FIG. 7B. As in FIG. 7A, a central permeate tube 20 is shown. Attached to this tube 20 is a membrane assembly 21 according to an embodiment of the present invention, which comprises, a permeate carrier sheet 22 (shown with hatched shading in the close up cross-section), and a membrane 23 comprising obstructions 28 that also function as feed spacers. In this illustration, feed flows predominantly from right to left and permeate from left to right in the permeate tube 20, spirally in the permeate carrier sheet 22 and radially across the membrane 23. The feed flow encounters the obstructions 28, which in turn alter flow characteristics in a manner beneficial to filtration.

Figure 7C:
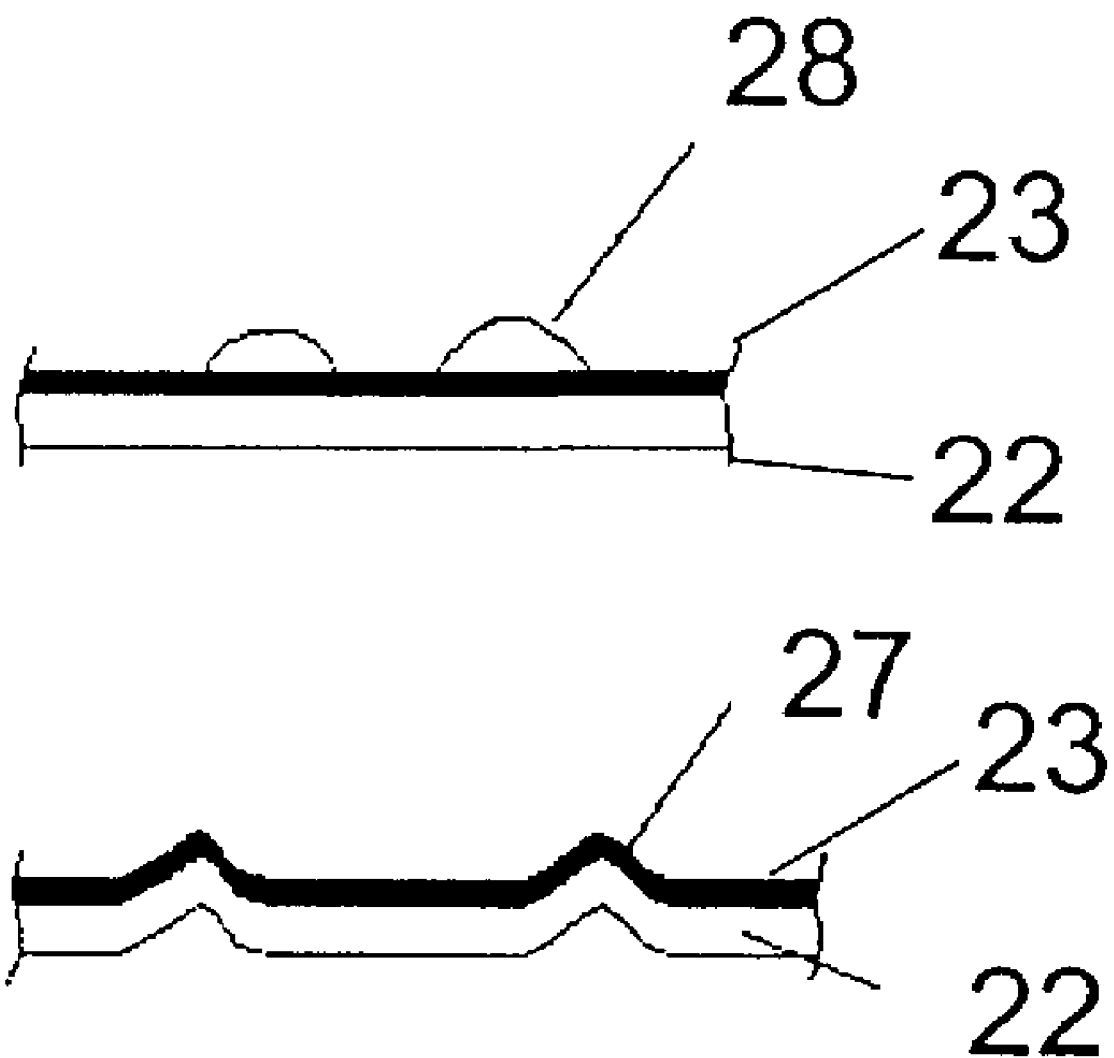
FIG. 7C is an illustration of two embodiments of the present invention wherein one comprises printed material and the other comprises dimples.

The aforementioned embodiments mention feed spacers, obstructions and/or dimples, which are at times interchangeable depending on function and design. According to the present invention, dimple fabrication is achieved through a variety of processes, including, but not limited to, exposure of a membrane to mechanical and/or thermal energy to thereby form dimples. Dimples may also be formed through molds and/or other steps in the membrane fabrication process. FIG. 7C shows a dimple 27 obstruction or spacer compared to a printed 28 obstruction.

Throughout the description herein, the terms "print," "printed" and "printing" refer to processes such as, but not limited to, ink-jet printing, off-set printing and stereolithography (or stereolithographic printing). These methods of printing use printing material, which includes, but is not limited to, "ink," which refers to a variety of materials, including, but not limited to, polymers, thermopolymers, and/or radiation curable polymers. In general, these inks are compatible with at least one of the aforementioned printing methods, or equivalent printing methods thereof. When an ink is printed on a membrane, a primary concern is membrane integrity. A variety of printing materials, or inks, have been found to be compatible with membranes described herein. Such materials, or inks, optionally include, but are not limited to, those discussed below.

As mentioned above, one type of printing method comprises off-set printing. Off-set printing methods known in the art of printing often comprise rotating drums which transfer ink to a substrate. Such commonly known methods are within the scope of the present invention. In accordance with an embodiment of the present invention, a method of making a membrane with spacers and/or obstructions comprises off-set printing with a suitable ink, for instance, a thermopolymer ink and/or radiation curable ink. Such materials are optionally layers through a repetitive process using traditional off-set printing methods.

In one embodiment, which has proven very useful in practice, the present invention encompasses making inventive 3-D spacers, structures, and/or obstructions through use of 3-D form fabrication methods and adaptations thereof, including, but not limited to, stereolithography and/or direct print techniques. Such techniques are taught in, for example, U.S. Pat. Nos. 6,103,176; 6,084,980; 6,048,487; 6,048,188; 6,036,911; 6,029,096; 6,027,682; 6,027,324; 6,001,297; 5,999,184; 5,997,291; 5,989,476; 5,965,079; 5,945,058; 5,943,235; 5,904,889; 5,902,538; 5,902,537; 5,897,825; 5,885,511; 5,870,307; 5,855,836; 5,855,718; 5,854,748; 5,840,239; 5,814,265; 5,779,967; 5,776,409; 5,711,911; 5,695,707; 5,695,707; 5,676,904; 5,672,312; 5,637,169; 5,569,349; 5,501,824; 5,234,636; 5,192,559; and 5,141,680. These patents are incorporated herein by reference.

Direct print techniques optionally comprise the use of a print head to spray tiny droplets of a thermoplastic or other suitable material onto a surface platform or other surface, much like an ink-jet printer. A 3-D form is built layer-by-layer until finished (techniques using only a single deposited layer are also within the scope of the present invention). Of course, the process is interruptible whereby circuit, catalyst, antifoulant, susceptor, and/or other material is optionally inserted and/or placed onto the 3-D form. Alternatively, or in conjunction with this process, catalyst, antifoulant, susceptor and/or other materials are optionally added to the thermoplastic and/or other material that is used to create the 3-D form. The direct print process, or an alternative process, is then optionally used to continue fabrication of the 3-D form. It is also understood that a mold or template may be constructed from the 3-D form whereby production of additional 3-D forms is possible from the mold or template.

Stereolithographic techniques optionally comprise exposing a liquid or semi-solid photosensitive material to radiation. This is optionally repeated in a layer-by-layer fashion to produce a 3-D form. In many commercially available stereolithographic systems, lasers, optics, photopolymer resin and computer hardware and software are used to produce a 3-D form. As with direct print, of course, the process is interruptible whereby circuit, catalyst, antifoulant, susceptor (e.g., electromagentic susceptor material for heating), and/or other material is optionally inserted and/or placed onto the 3-D form. Alternatively, or in conjunction with this process, catalyst, antifoulant, susceptor and/or other materials are optionally added to the thermoplastic and/or other material that is used to create the 3-D form. The stereolithographic process, or an alternative process, is then optionally used to continue fabrication. It is also understood that a mold or template may be constructed from the 3-D form whereby production of additional 3-D forms is possible from the mold or template.

In an example of a direct print embodiment, a printing material comprising a mixture of waxes with a high melting point (up to 120° C.) and a surfactant (added to improve flow characteristics) was used. The Material Safety Data Sheet (MSDS) from the supplier (3D Systems, Inc., Valencia, Calif.) described the printing material as a thermopolymer containing hydrocarbons plus amides and esters. For example, a thermopolymer comprising waxes, polymerizers and surfactants is within the scope of the present invention. Further examples of thermopolymers are included in U.S. Pat. No. 6,133,355, entitled "Selective deposition modeling materials and method," to Leyden, et al., assignee 3D Systems, Inc. (Valencia, Calif.), issued Oct. 17, 2000, the entire specification of which is incorporated herein by reference.

In an embodiment of the present invention, the printing material is applied to a membrane surface (active or otherwise) using printing machines and associated computer software sold under the mark ThermoJet™, manufactured by 3D Systems of Valencia, Calif. Alternately, other equipment known in the art is used to accomplish the same results.

Trials using the ThermoJet™ system and associated materials showed that the print material adhered very well to the membrane and that the heat of the print material and of the ThermoJet™ printing machine did not damage the active membrane surface. Again, the present invention is not limited to printing on active surfaces.

In a ThermoJet™ printing process, for example, layers are deposited onto a substrate. According to an embodiment of the present invention, a typical layer thickness is approximately 1.5 mils or 0.0038 cm (38 µm). Thus, obstructions of approximately 38 µm (1 layer), 76 µm (2 layers), 114 µm (3 layers), 152 µm (4 layers), 190 µm (5 layers), 228 µm (6 layers), 304 µm (7 layers), etc. are possible. Results from spiral wound reverse osmosis membrane modules with spacers comprising a height of less than approximately 280 µm have shown improved performance and results from spacers comprising a height of less than approximately 150 µm have also shown improved performance. Overall, the ThermoJet method of printing allows for the making of spacers that comprise heights less than any commercially available RO module spacer.

In another embodiment, a process for making baffles, dimples, spacers, structures, and/or obstructions comprises stereolithography that comprises, for example, a laser and, for example, a photocurable resin, which can be classified, for example, but not limited to, as an epoxy, vinylether, or acrylate.

Figure 8:
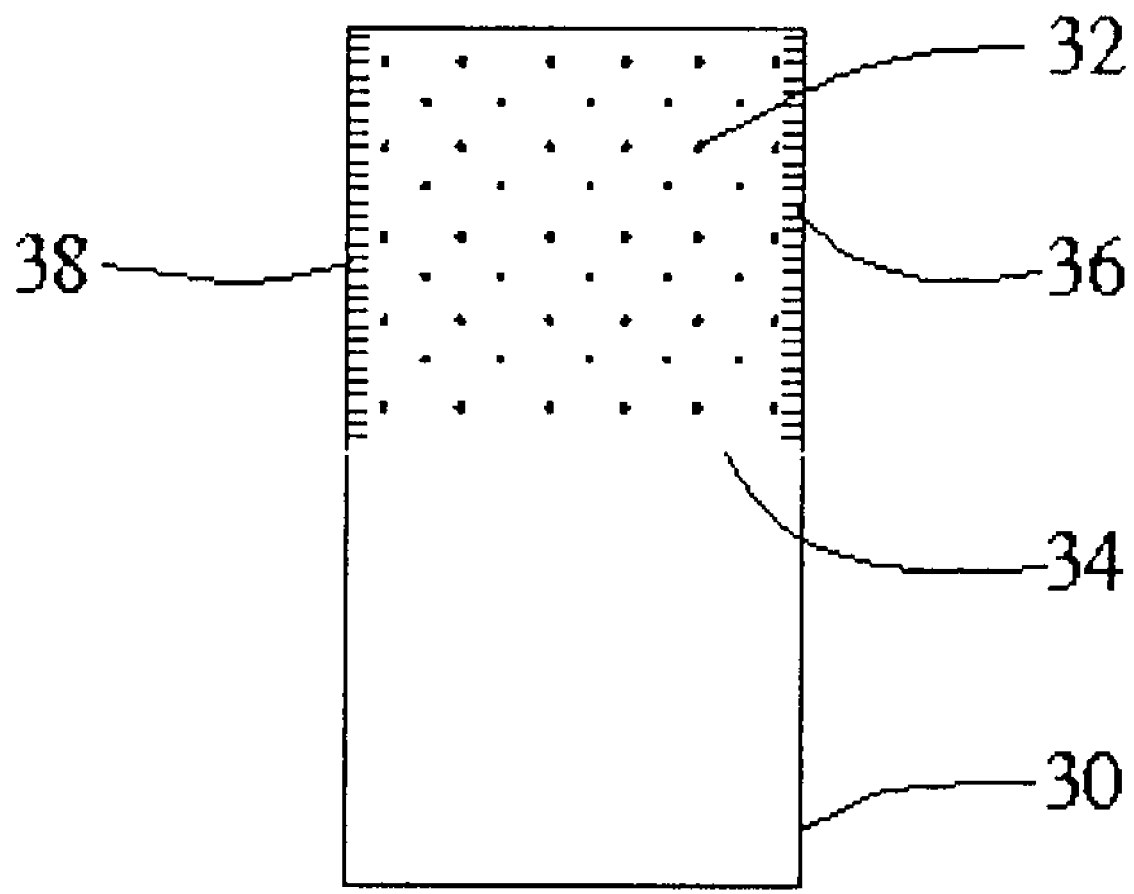
FIG. 8 is an illustration of a membrane according to an embodiment of the present invention.

In an embodiment of the present invention shown in FIG. 8, the design of the print comprises (1) a pattern of printed ridges 36 on one edge (lengthwise) of the printed membrane 30 to ensure that the inlet end of the wound module remains open, (2) right-circular posts 32 printed in the body of the membrane at 0.25 inch (0.64 cm) spacing, oriented in a diamond pattern parallel to the direction of feed solution flow, and (3) a pattern of printed ridges 38 on the opposite edge (lengthwise), also known as the exit end of the wound module, of the membrane which are intended to assist in the winding of the module and will be removed in final trimming of the module prior to housing. Since the membrane is optionally folded over itself before winding, only half of the membrane 30 is printed and is separated at the seam line 34. In an embodiment of the present invention, the ridges are approximately evenly spaced along the edges, printed parallel to the feed solution flow direction, and extend into the membrane about 1.25 inches (3.2 cm) in the first case and about 0.75 inches (1.9 cm) in the second case. At final trimming, about 0.75 inches (1.9 cm) of the module is removed from each end, leaving about 0.50 inches (1.3 cm) of ridge pattern at the inlet end of the final module and no ridges at the exit end of the final module.

In an embodiment of the present invention the aspect ratio, or ratio of the height to the diameter of the individual post, does not exceed about 1.0 to reduce the risk of breakage during handling.

In an alternative embodiment of the present invention, the ridge pattern is optionally not printed on either edge of the membrane.

In an alternative embodiment of the present invention, the ridge pattern is optionally printed on both edges of the membrane and is less than approximately 0.75 inches (1.9 cm) in length, intended only to assist in winding the module, and is removable at final trimming.

In an alternative embodiment of the present invention, the feed spacer is optionally a separate sheet crafted using other materials discussed further below, and having the following properties: (1) a thickness of about 3.0 mils (0.008 cm); (2) a high porosity (95% or higher) and; (3) contain structures, known as "biomimetic", which would increase and optimize localized vorticity of the feed solution in both steady and pulsing flow. Several methods have been identified that may be appropriate to manufacture feed spacers having the desired properties. They include chemical machining and self-assembly based electroforming, and a blending of these two processes. The chemical etching process is a manufacturing method that is capable of producing these structures through a material removal process. In contrast, the self-assembly technique uses self-assembled monolayers of, for example, but not limited to, alkane thiols to define patterns through which structures are built up through the electroforming process. Of course, other similar processes known in the art of electroforming and surfactant technology are within the scope of the present invention.

Pressure/Flow Pulsing of the Feed Solution

An embodiment of the present invention comprises a process and mechanism for imposing a pressure and flow pulse, as an addition to a steady applied pressure, which pulse has the following characteristics: (1) a frequency of up to 10 cycles/second (10 Hz); (2) an amplitude (or fluid volume) on each pulsing stroke that is up to 12% of the total volume of the feed spacer in the module; and (3) a waveform that is approximately sinusoidal. Used together with particular structures in the feed spacer, which are other embodiments of the inventions claimed herein, this preferred embodiment of the present invention causes fluid motion within the feed spacer referred to herein as localized vorticity. This localized vorticity acts to reduce concentration polarization.

In alternative embodiments, the pulsing frequency is optionally higher or lower than 10 cycles/second, the amplitude is optionally greater than 12% of the total volume of the feed spacer, and the waveform is optionally any non-sinusoidal shape form.

Shapes for Obstructions in Feed Space

Figure 9:
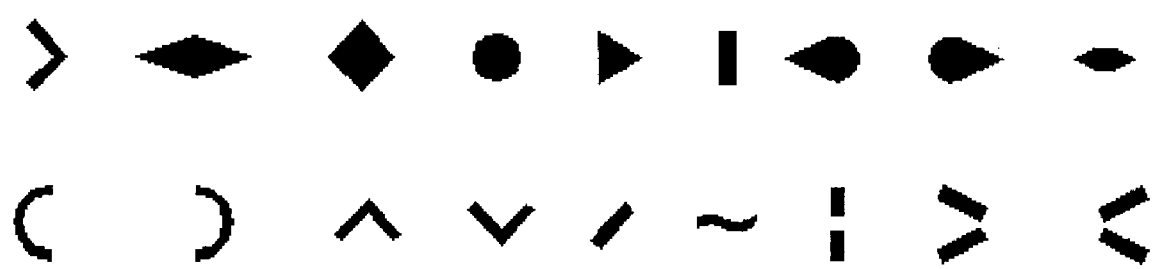
FIG. 9 is an illustration of a variety of cross-sections for obstructions and/or spacers according to an embodiment of the present invention.

A preferred embodiment of the present invention comprises printing posts or obstructions to fluid flow directly on the membrane as the feed spacer, which posts (or other structures) optionally comprise shapes with drag coefficients different than right-circular cylinders. These structures need not have uniform height and/or other characteristics. For example, a variety of shapes are possible for a single membrane unit. Also, while cross-sections are given in FIG. 9, the height of these structures are optionally sloped and/or otherwise adjusted to maximize effect (again, obstructions need not necessarily function also as feed spacers). Therefore, the present invention encompasses, for example, but not limited to, notched, spiked and/or sloping structures. FIG. 9 shows various, but not limited to, printed post shape forms that may be printed on the membrane surface. In this embodiment of the present invention, the shapes include, but are not limited to, the following: square cylinders of varying dimensions; triangular cylinders with various angles and dimensions selected to provide the optimum drag coefficients; semitubular or semicircular structures of various dimensions; star-shaped structures of various dimensions and various numbers of points on the stars selected to provide optimum drag coefficients; and structures of various dimensions connecting the posts. In particular fluid dynamic regimes, as determined by the thickness of the print, hence of the feed spacer, and the velocity of the feed solution, all related through the Reynolds Number ($R_e$), this embodiment of the present invention will cause localized vorticity in, for example, the form of von Karman vortex streets or other types of vorticity that will reduce concentration polarization.

An alternative embodiment of the present invention comprises crafting shapes, such as, but not limited to, those described in the aforementioned embodiment of the present invention, into a separate thin feed spacer using manufacturing methods as described in an alternative embodiment of the invention.

Patterns for the Obstructions in Feed Space

Figure 10:
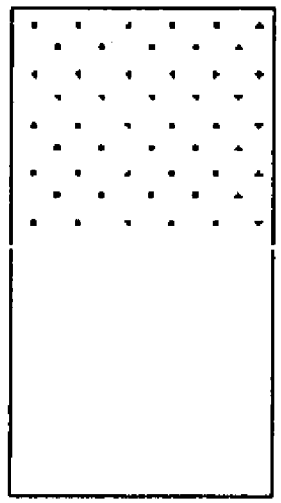
FIG. 10 is an illustration of a variety of obstruction and/or spacer arrangements on a membrane according to an embodiment of the present invention.
Figure 10:
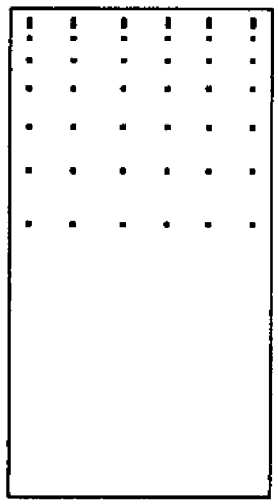
Figure 10:
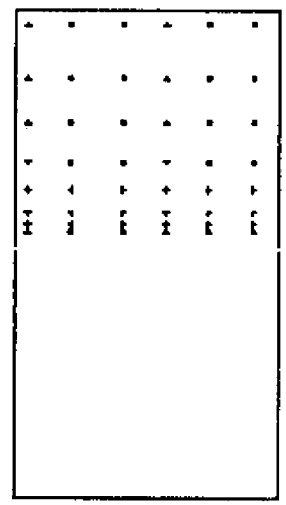
Figure 10:
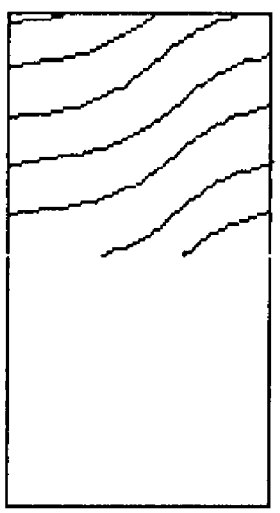
Figure 10:
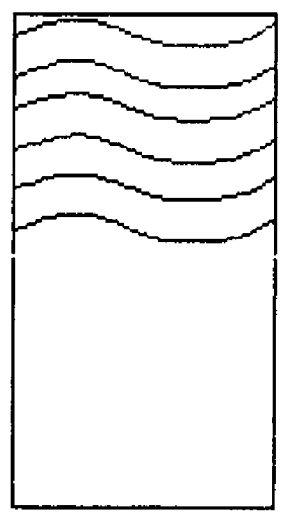
Figure 10:
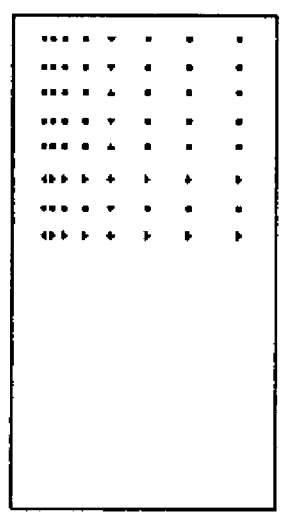

An embodiment of the present invention comprises printing posts or obstructions to fluid flow, as described above, in patterns and orientations relative to the direction of fluid flow as shown in FIG. 10. These patterns and orientations act to increase the tortuosity of the flow path, thereby increasing the localized vorticity and reducing concentration polarization. In this embodiment of the present invention, the patterns include, but are not limited to, the following: various spacings of the shapes of obstructions parallel to the fluid flow path; various spacings of the shapes of obstructions orthogonal to and at various angles between orthogonal and parallel to the fluid flow path; and various shapes at various locations, spacings, and angles relative to the feed solution flow path. In an embodiment of the present invention, the orientations of the shapes, as described above, include, but are not limited to, the following: various angles of the principle axis of the shapes relative to the direction of the feed solution flow; various angles for the structures of various dimensions connecting the posts relative to the direction of the feed solution flow so as to direct the flow into paths of greater tortuosity; and various shapes of posts as discussed in embodiments presented above printed in the channels created by the structures of various dimensions connecting the posts. While the term "post" is used, it is understood that structures not commonly within the definition of "post" are within the scope of the present invention.

An alternative embodiment of the present invention comprises crafting shapes, such as described in other embodiments of the present invention, into a separate thin feed spacer using manufacturing methods as described above.

Silver Impregnation and Other Means for Biofilm Control

It is well known in the water treatment industry that biofilm contamination of reverse osmosis elements is one of the leading causes of failure of reverse osmosis elements. It is also well known that colloidal silver will mitigate the formation of biofilm. In an embodiment of the present invention, colloidal silver is added to the membrane material in the process of production of membrane sheets. In an alternative embodiment of the present invention, colloidal silver is added to the wax (or other medium) in the direct print machine. The printed posts (obstructions, spacers, baffles, etc.) then comprise the direct print wax, which includes a component of colloidal silver. Because the raw water is exposed to the active membrane side of the sheet, the feed spacer posts will comprise an element of colloidal silver, which will help mitigate the formation of biofilm on the surface of the membrane sheet. Of course other agents that prevent biofouling and/or contamination are within the scope of the present invention. For example, techniques used in the marine industry are suitable for use with the present invention. Such techniques include, but are not limited to, use of: copper (I) oxide; copper (I) oxide/4,5-dichloro-2-n-octyl-3(2H)-isothiazolone; copper (I) oxide/Diuron; copper (I) oxide/Zineb; copper (I) oxide/Irgarol 1051; copper (I) thiocyanate/Diuron; copper (I) thiocyanate/Irgarol 1051; copper (I) oxide/Zinc pyrithione; tributyltin ("TBT"); and the like. Note that antifoulants that do not contain copper, tin, zinc, and other metals are also within the scope of the present invention.

The present invention also optionally comprises electrical circuitry on and/or integrated into the membrane and/or spacer(s). Such circuitry optionally provides for heating and/or the application/production of an electrical potential or charge distribution. Such circuitry is optionally enabled through use of stereolitographic techniques know in the art of stereolithography. Such optionally circuitry optionally provides for in situ cleaning of membranes, reaction of certain inlet stream constituents to useful products, reaction of certain foulants to nonfouling material, enhanced separations based on charge and/or potential, and the like.

The present invention also optionally comprises at least one catalyst on and/or integrated into the membrane and/or spacer(s). Such catalyst optionally provides for a catalytic reaction that optionally provides for in situ cleaning of membranes, reaction of certain inlet stream constituents to useful products, reaction of certain foulants to nonfouling material, enhanced separations based on charge and/or potential, and the like.

The present invention also optionally comprises at least one susceptor material on and/or integrated into the membrane and/or spacer(s). Such susceptor optionally provides for heating in conjunction with the application of electromagnetic radiation, such as, but not limited to, microwave and rf radiation. Heating via a susceptor optionally provides for in situ cleaning of membranes, reaction of certain inlet stream constituents to useful products, reaction of certain foulants to nonfouling material, enhanced separations based on charge and/or potential, and the like.

As known in the food industry, microwave susceptor packaging is a form of active packaging that provides browning and crisping to foods that are prepared in the microwave oven. It is based on the light deposition of a microwave active metal on a thermally stable substrate (for example, but not limited to, PET) and the lamination of this sheet to a back stock that provides a lamination with rigidity and stiffness. Once placed in the microwave (or microwave field), these packages will reach temperatures in excess of 150° C. almost instantaneously. This high heat allows for the food to cook quickly and it promotes the Maillard reaction that enhances browning characteristics. Two varieties of susceptor that are commonly used in the food industry include: (i) aluminum susceptors that provide, for example, a final temperature of at least approximately 190° C., and (ii) Inconel susceptors that provide, for example, heat environments in excess of 218° C.; however, the present invention is not limited to these two varieties.

The preceding examples can be repeated with similar success by substituting the generically or specifically described reactants and/or operating conditions of this invention for those used in the preceding examples.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A spiral wound module for fluid treatment comprising:
   a spiral wound filtration membrane comprising integrated feed spacers, said feed spacers comprising post-like protrusions isolated from each other in all planar directions along a surface of said membrane, said protrusions arranged in a plurality of rows parallel to an edge of said membrane;

wherein a spacing between adjacent said rows gradually decreases as said rows approach said edge.

2. The spiral wound module of claim 1 wherein said feed spacers comprise a thermopolymer.

3. The spiral wound module of claim 2 wherein said thermopolymer comprises at least one member selected from the group consisting of hydrocarbons, urethanes, amides and esters.

4. The filtration membrane of claim 1 wherein said feed spacers comprise at least one member selected from the group consisting of embossed, ink-jet printed, off-set printed, direct printed and stereolithographic printed feed spacers.

5. The spiral wound module of claim 1 wherein said feed spacers comprise different shapes.

6. The spiral wound module of claim 1 wherein said feed spacers are in various patterns.

7. The spiral wound module or claim 1 wherein said feed spacers are at various orientations.

8. The spiral wound module of claim 1 wherein said membrane comprises at least one type of membrane selected from the group consisting of reverse osmosis, nano-filtration, ultra-filtration, microfiltration and particle filtration membranes.

9. The spiral wound module of claim 1 wherein said membrane comprises a biocide impregnated into said membrane.

10. The spiral wound module of claim 1 further comprising electrical circuitry.

11. The spiral wound module or claim 1 further comprising a catalyst.

12. The spiral wound module or claim 1 further comprising a susceptor.

13. The spiral wound module of claim 1 wherein said feed spacers comprise a maximum height of less than approximately 0.028 cm.

14. The spiral wound module or claim 13 wherein said feed spacers comprise a maximum height of less than approximately 0.015 cm.

15. A method of making a spiral wound module for use in fluid treatment, the method comprising the steps of:
providing a filtration membrane;
integrating feed spacers on a surface of the membrane, said feed spacers comprising post-like protrusions isolated from each other in all planar directions along a surface of said membrane;
arranging the protrusions in a plurality of rows parallel to an edge of the membrane;
gradually decreasing a spacing between adjacent rows as the rows approach said edge; and
spirally winding the membrane into a cylindrical shape.

16. The method of claim 15 wherein the integrating step comprises a method selected from the group consisting of embossing, ink-jet printing, off-set printing, direct printing, and stereolithographic printing.

17. The method of claim 15 wherein said reed spacers comprise at least one variation selected from the group consisting of shapes, patterns and orientations.

18. The method of claim 15 wherein the feed spacers comprise a maximum height of less than approximately 0.028 cm.

19. The method of claim 15 wherein said membrane comprises at least one type of membrane selected from the group consisting of reverse osmosis, nano-filtration, ultra-filtration, microfiltration and particle filtration membranes.

20. The method of claim 15 wherein said membrane comprises a biocide impregnated into said membrane.

21. The method of claim 15 wherein said membrane further comprises at least one additional element selected from the group consisting of electrical circuitry, a catalyst and a susceptor.

22. A method or using a spiral wound filtration membrane for treating a fluid comprising the steps of:
providing a spiral wound filtration membrane comprising feed spacers, wherein the feed spacers comprise at least one member selected from the group consisting or embossed, ink-jet printed, off-set printed, direct printed and stereolithographic printed feed spacers, the feed spacers comprising post-like protrusions isolated from each other in all planar directions along a surface of said membrane and arranged in a plurality of rows parallel to an edge of the membrane;
gradually decreasing a spacing between adjacent rows as the rows approach the edge; and
providing in the fluid at least one result selected from the group consisting of creating a diffusion effect, reducing concentration polarization, reducing fluid shear, and inducing localized vorlicity.

23. The method of claim 22 further comprising the step of pulsing fluid low through the membrane.

24. The method of claim 22 wherein said feed spacers comprise at least one variation selected from the group consisting of different shapes, various patterns, and various orientations.

25. The method of claim 22 wherein said membrane comprises at least one type of membrane selected from the group consisting of reverse osmosis, nano-filtration, ultra-filtration microfiltration and particle filtration membranes.

26. The method of claim 22 wherein said membrane comprises a biocide impregnated into said membrane.

27. The method of claim 22 wherein said membrane further comprises at least one element selected from the group consisting of electrical circuitry, a catalyst, and a susceptor.

28. The spiral wound module of claim 1 comprising a biocide impregnated into said filtration membrane.

29. The spiral wound module of claim 28 wherein said biocide comprises a silver material.

30. The spiral wound module of claim 28 wherein said biocide comprises at least one material selected from the group consisting of copper (I) oxide, copper (I) oxide/4,5-dichloro-2-n-octyl-3(2H)-isothiazolone, copper (I) oxide-Diuron, copper (I) oxide/Zineb, copper (I) oxide/Irgarol 1051, copper (I) thiocyanate/Diuron, copper (I) thiocyanate/Irgarol 1051, copper (I) oxide/Zinc pyrithione, and tributyltin ("TBT").

* * * * *